Sept. 20, 1932.  H. D. CHURCH  1,878,379
LUBRICATING SYSTEM FOR THE POWER PLANT OF AN AUTOMOBILE
Filed Oct. 28, 1929  4 Sheets-Sheet 1

INVENTOR
HAROLD D. CHURCH
BY
RMCooper
ATTORNEY

Sept. 20, 1932. H. D. CHURCH 1,878,379
LUBRICATING SYSTEM FOR THE POWER PLANT OF AN AUTOMOBILE
Filed Oct. 28, 1929 4 Sheets-Sheet 2

INVENTOR
HAROLD D. CHURCH
BY
R. M. Cooper
ATTORNEY

Sept. 20, 1932.   H. D. CHURCH   1,878,379
LUBRICATING SYSTEM FOR THE POWER PLANT OF AN AUTOMOBILE
Filed Oct. 28, 1929   4 Sheets-Sheet 3
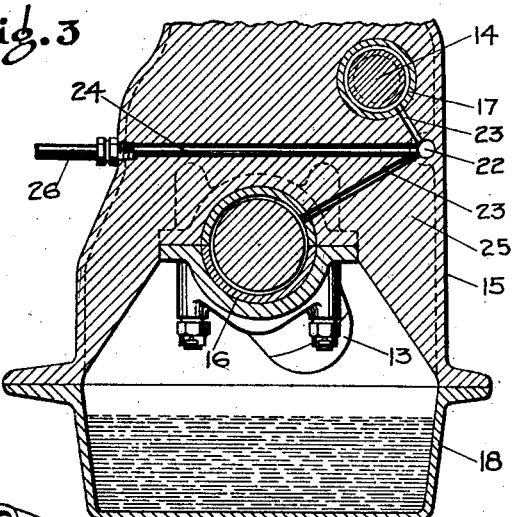
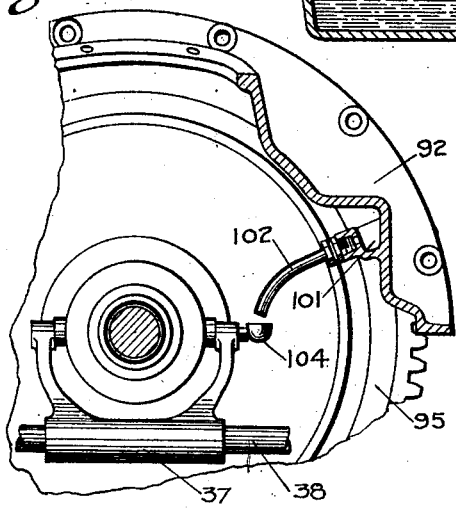
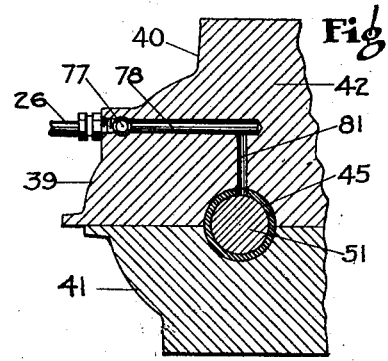
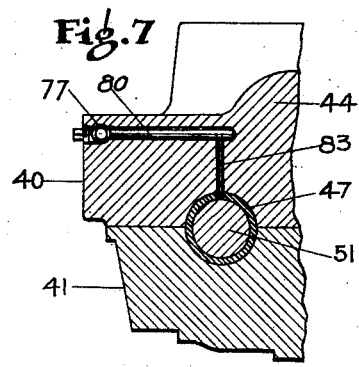
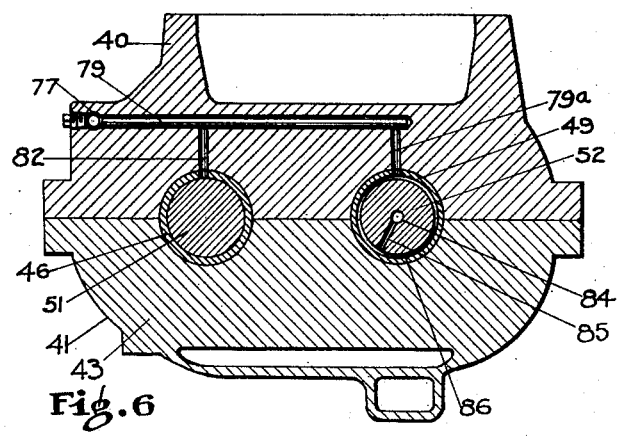
INVENTOR
HAROLD D. CHURCH
BY
R. M. Cooper
ATTORNEY Sept. 20, 1932. H. D. CHURCH 1,878,379
LUBRICATING SYSTEM FOR THE POWER PLANT OF AN AUTOMOBILE
Filed Oct. 28, 1929 4 Sheets-Sheet 4

INVENTOR
HAROLD D. CHURCH
BY RMCooper
ATTORNEY

Patented Sept. 20, 1932

1,878,379

UNITED STATES PATENT OFFICE

HAROLD D. CHURCH, OF CLEVELAND, OHIO, ASSIGNOR TO THE WHITE MOTOR COMPANY, OF CLEVELAND, OHIO, A CORPORATION OF OHIO

LUBRICATING SYSTEM FOR THE POWER PLANT OF AN AUTOMOBILE

Application filed October 28, 1929. Serial No. 403,015.

This invention relates to a lubricating system for the power plant of an automobile.

It is an object of this invention to provide a simple and efficient circulatory lubricating system for the engine, clutch, and transmission of an automobile.

It is a further object of this invention to provide a lubricating system for the transmission of an automobile which will effect an efficient lubrication of the wearing surfaces thereof by means of a light lubricant such as that commonly used in the lubricating system of an internal combustion engine.

Other objects will hereinafter appear.

The invention itself will be more readily understood from the description of one practical embodiment thereof, illustrated in the accompanying drawings, in which Figure 1 is a side elevational view of the power plant of an automobile, certain parts being broken away in order to show the internal mechanism.

Figure 3 is a fragmentary vertical section on line 3—3 of Figure 2.

Figure 4 is a fragmentary vertical section on line 4—4 of Figure 2.

Figure 5 is a fragmentary vertical section on line 5—5 of Figure 2.

Figure 6 is a vertical section on line 6—6 of Figure 2.

Figure 7 is a fragmentary vertical section on line 7—7 of Figure 2.

Figure 1:
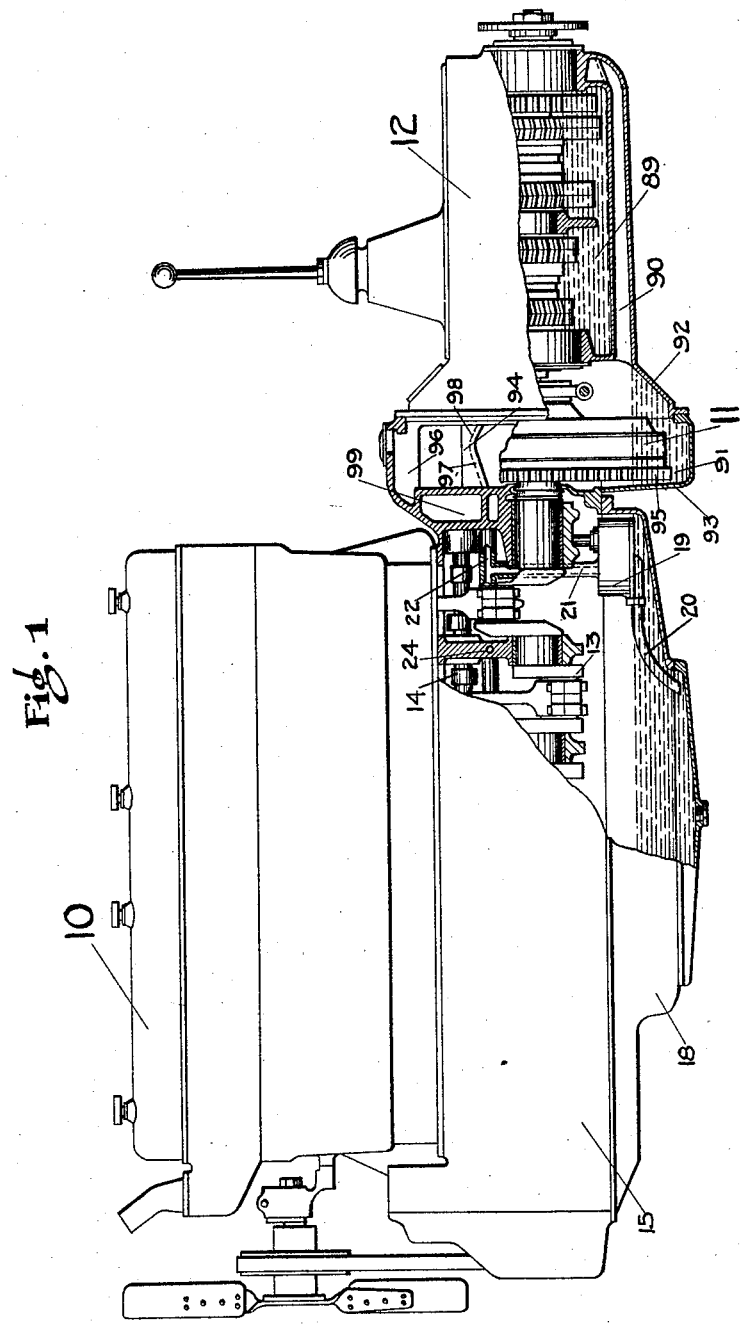

The power plant disclosed in the drawings consists of an engine 10, a clutch 11, and a transmission 12. The engine 10 is of a more or less conventional type, and comprises a crank shaft 13 and a cam shaft 14 mounted with the engine crank case 15 in bearings 16 and 17, respectively. Secured to the bottom of the crank case there is an oil pan 18 adapted to hold a supply of oil for lubricating the wearing surfaces of the engine, clutch, and transmission. Mounted on the side wall of the crank case 15 superadjacent the oil pan 18, there is an oil pump 19 operatively connected to the cam shaft 14 and provided with a downwardly extending intake pipe 20. This pump communicates through a discharge conduit 21 with a longitudinally extending distributing conduit or manifold 22 formed on a side wall of the crankcase 15. The manifold 22 joins with ducts 23 which lead through the end walls and webs of the crankcase to the crank shaft and cam shaft bearings 16 and 17, and with a duct 24 which leads through the crank case web 25 to the opposite side of the engine. The duct 24 joins with a conduit or pipe 26 which leads into the transmission 12. The clutch 11 is similar in construction to the clutch disclosed in the United States Patent Number 1,239,778 and comprises a shaft 27 and a sleeve 28 which correspond to the shafts D and the sleeve C disclosed in the patent. Mounted on the rear end of the sleeve 28 there is an anti-friction bearing 29 secured in place by a nut 30. The outer race 31 of the bearing 30 supports a tightly fitting angulated member 32, the inwardly directed flange of which extends across the forward face of the bearing. Secured to the rear face of the race 31 by a plurality of screws 33, there is a second angulated annular member 34 which cooperates with the member 32 to form a housing for the bearing 29. The member 32 is formed with lateral trunnions 35 and 36 which extend into bearing apertures formed in the arms of a yoke 37. The yoke 37 is rigidly secured to a lateral rock shaft 38 journalled in suitable bearings formed in the lower section of the transmission case 39. As will be readily apparent from the foregoing description and from a study of the aforesaid patent, rotative movement of the shaft 38 will shift the sleeve 28 to engage or disengage the plates of the clutch, depending upon the direction of rotation.

The transmission case 39 comprises an upper section 40 and a lower section 41, each of which is formed with a forwardly disposed web 42, a centrally disposed web 43, and a rear end wall 44. Mounted in apertures composed of componental semicircular recesses formed in the webs and end walls of the sections 40 and 41, there are two sets of axially aligned bearings, a left end set consisting of bearings 45, 46, and 47, and a right end set consisting of bearings 48, 49, and 50. Journalled within the left end set of bearings 45, 46, and 47, there is a counter shaft 51, and journalled within the intermediate bearing 49 and the rear bearing 50 of the right end set there is a driven shaft 52, the forward end of which is supported with a bearing 53 mounted within a recess formed in the aligned clutch shaft 27. The forward bearing 48 of the right end set receives and supports the clutch shaft 27 contiguous to its juncture with the driven shaft 52.

Formed on the rear end of the clutch shaft 27 there is a driving gear 54 which meshes with a driven gear 55 rigidly mounted upon the forward end of the counter shaft 51. The driven shaft 52 supports a plurality of loosely mounted gears 56, 57, and 58, which respectively mesh with driving gears 59, 60, and 61, keyed upon the counter shaft 51. The driven shaft 52 also supports a rigidly attached gear 62 which is adapted to be connected by conventional slidably mounted, reverse idler gear (not shown), to a gear 63 rigidly mounted upon the countershaft.

As clearly shown in the drawings, the loosely mounted gears 56, 57, and 58 are respectively equipped with bearing members 64, 65, and 66. Splined upon the forward end of the driven shaft 52, there is a slidable clutch member 67 which is provided with teeth 68 adapted for engagement with teeth 69 formed on the gear 54, and with teeth 70 adapted for engagement with teeth 71 formed on the gear 56. Similarly mounted upon the central portion of the shaft 52 intermediate the gears 57 and 58, there is a second clutch member 72 which is provided with teeth 73 adapted for engagement with teeth 74 formed on the gear 57, and with teeth 75 adapted for engagement with teeth 76 formed on the gear 58.

Figure 2:
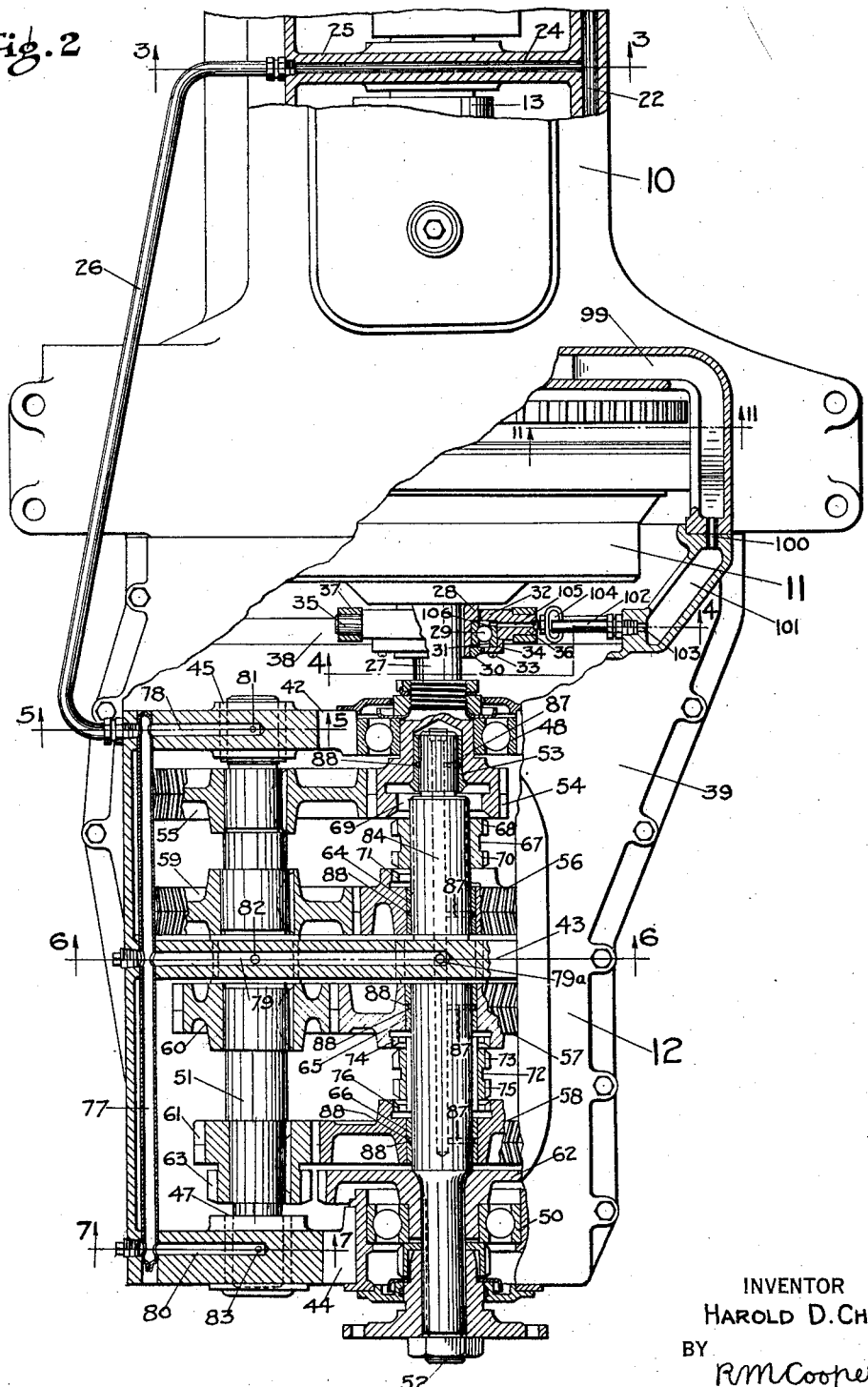
Figure 2 is a top plan view of the power plant illustrated in Figure 1, certain parts being broken away in the interest of clarity.
Figure 8:
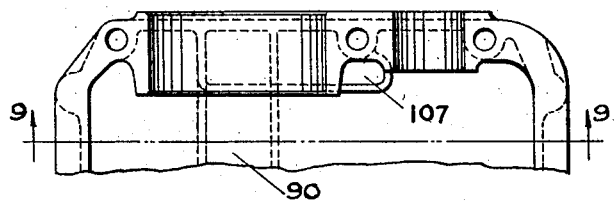
Figure 8 is a fragmentary top plan view of the rear end of the bottom section of the transmission case.
Figure 9:
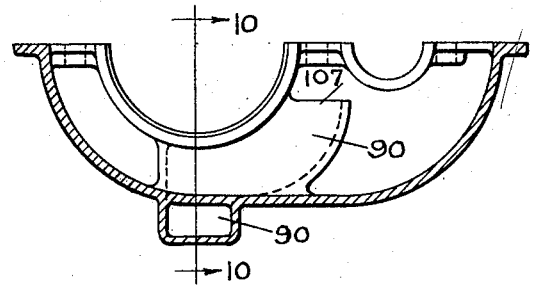
Figure 9 is a vertical section on the line 9—9 of Figure 8.
Figure 10:
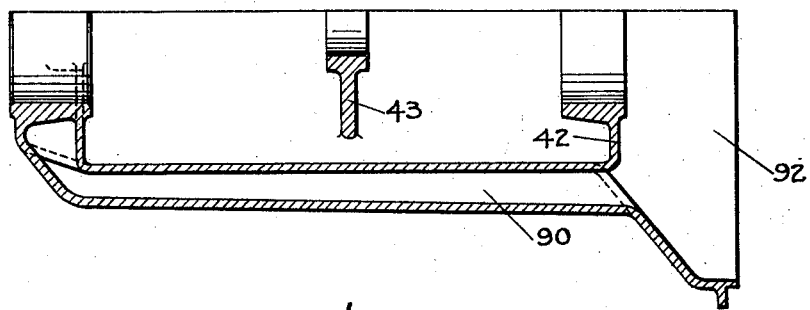
Figure 10 is a longitudinal section of the bottom section of the transmission case, the plane of the section being indicated by the line 10—10 of Figure 9.
Figure 11:
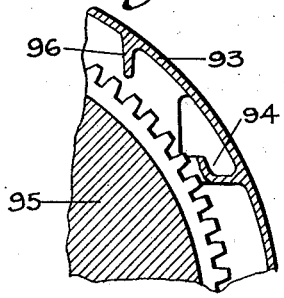
Figure 11 is a fragmentary vertical section of line 11—11 of Figure 2.

Assuming that in each case the clutch members 67 and 72 occupy neutral positions as shown in Figure 2, and that the reverse idler gear is out of mesh with gears 62 and 63, four forward speeds and a single reverse speed are obtained as follows.

First speed, by shifting the clutch member 72 in a rearward direction to bring its teeth 75 into engagement with teeth 76 on the gear 58, the resultant drive being through gears 54, 55, 61, and 58.

Second speed, by shifting clutch member 72 in a forward direction to bring its teeth 73 into engagement with the teeth 74 on the gear 57, the resultant drive being through gears 54, 55, 60, and 57.

Third speed, by shifting clutch member 67 in a rearward direction to bring its teeth 70 into engagement with teeth 71 on the gear 56, the resultant drive being through gears 54, 55, 59, and 56.

Fourth speed or direct drive, by shifting the clutch 67 in a forward direction to bring its teeth 68 into engagement with teeth 69 on the gear 54, and Reverse, by shifting the reverse idler gear to a position wherein its teeth mesh with the teeth of the gears 62 and 63, the drive being through gears 54 and 55, gear 63, the reverse idler gear, and gear 62.

The mechanism for shifting the clutch members 67 and 72 and the reverse idler gear form no part of the present invention and are neither shown or described.

Mounted in the end wall 44 and the webs 42 and 43 of the upper section 40 of the transmission case 39, there is a distributing conduit or manifold 77 which is connected at its forward end with the pipe 26. This manifold communicates through ducts 78, 79, and 80 with ducts 81, 82, and 83, which lead into the counter shaft bearings 45, 46, and 47, respectively. Formed in the driven shaft 52, there is an axially extending duct 84 which communicates with the duct 79 through a radially extending duct 85 formed in the shaft, a groove 86 formed in the bearing 49 and a vertically extending duct 79a formed in the web 43 of the upper section of the transmission case. In addition to the radially extending duct 85, the driven shaft 52 is formed with a plurality of similarly extending ducts 87 which connect the duct 84 with the grooves 88 formed in the bearings 53, 64, 65, and 66.

As clearly shown in the drawings, the end wall 44 and the webs 42 of the lower section 40 of the transmission case 39 forms with the side walls of the section a reservoir 89 which receives the oil discharged through the counter shaft bearings 45, 46, and 47, the forward driven shaft bearing 53, and the bearings 64, 65 and 66 carried by the loosely mounted gears 56, 57, and 58. The reservoir 89 communicates through an angulated conduit 90 formed on the end wall and bottom wall of the section 40 with a reservoir 91 formed by the forwardly disposed portion 92 of the section 41 and the fly-wheel housing 93 of the engine. Formed on the cylindrical wall of the housing 93 there is an inwardly extending trough 94 which receives oil thrown up from the reservoir 91 by the engine fly-wheel 95. Extending inwardly from the cylindrical wall of the housing 93 above the trough 94, there is a flange 96 which deflects the upwardly directed oil into the trough.

As clearly shown in Figure 1 of the drawings, the bottom of the trough 94 is angulated and comprises two oppositely inclined portions, a forwardly disposed portion 97, and a rearwardly disposed portion 98. This trough communicates through a conduit 99 formed on the rear wall of the housing 93 with the interior of the crank case 15, and through a duct 100 formed in the abutting flanges of the crank case and transmission case with a trough 101 formed on the side wall of the transmission case. Screwed into the rear end wall of trough 101 there is a pipe 102 which communicates through a duct 103 with the interior of the trough. The pipe 102 extends downward into close proximity to the mouth of a cup 104 carried by the trunnion 36 of the member 32. The cup 104 communicates with the interior of the bearing 29 by means of a duct 105 formed in the trunnion 36 and a duct 106 formed in the outer race of the bearing.

When the engine is running, the oil pump 19 draws oil from the oil pan 18, and delivers it under pressure through the intercommunicating conduits 21, 22, 23, 24, 26, 77, 78, 79, 80, 81, 82, 83, 79a, 86, 85, 84, and 87 to the engine crank shaft and cam shaft bearings 16 and 17 and to the transmission bearings 45, 46, 47, 49, 53, 64, 65, and 66. Oil is forced through the engine and transmission bearings, just enumerated, and flows from such bearings into the underlying reservoirs, the engine oil pan 18 and the reservoir 89 in the lower section of the transmission case. Whenever the level of the oil in the reservoir 89 exceeds the height of the lip 107 of the conduit 90, oil flows from the reservoir 89 into the conduit 90 and thence into the reservoir 91 formed by the fly-wheel housing of the engine and the forwardly disposed portion of the transmission case. The flywheel 95 effects the delivery of oil from the reservoir 91 into the trough 94 formed on the side wall of the engine bell housing 93, and is effective in maintaining the level of the oil in the reservoir 91 below the mouth of the conduit 90. The trough 94, due to its angulated bottom wall, divides the oil delivered into it, so that the major portion flows forwardly into the conduit 99, and from there into the engine oil pan 18, the smaller portion flowing through the conduit 100, trough 101 and pipe 102 into the cup 104 carried by the trunnion 36 of the member 32. The oil delivered into the cup 104 flows through the ducts 105 and 106 formed respectively in the trunnion 36 and the outer race of the bearing 29 into the interior of the bearing 29 from where it seeps to the exterior of the bearing encasing structure and finally drops into the reservoir 91. It should be noted that the oil within the reservoir 89 is maintained at a constant level, even with the lip 107 of the conduit 90, and that at such level the transmission gears and the antifriction bearings 48 and 50 are partially immersed, thereby providing for lubrication of the teeth of the transmission gears and the wearing surfaces of the bearings 48 and 50.

Although the foregoing description is necessarily of a detailed character, in order that the invention may be completely set forth, it is to be understood that the specific terminology is not intended to be restrictive or confining, and that various rearrangements of parts and modifications of structural details may be resorted to without departing from the spirit or scope of the invention.

I claim as my invention:

1. The combination with the power plant of an automobile comprising an engine, a clutch and a transmission, of an oil reservoir in said engine, means for delivering oil under pressure from said reservoir to bearings in said transmission, a reservoir in the flywheel housing of said engine communicating with the interior of the transmission housing and receiving oil therefrom, a trough on the side wall of the engine fly-wheel housing positioned to receive oil thrown up by the engine fly-wheel, means for conveying oil from said trough to said first named reservoir, and means for conveying oil from said trough to a wearing surface of said clutch.

2. The combination with the power plant of an automobile comprising an engine and a transmission, of an oil reservoir in said engine, means for delivering oil under pressure from said reservoir to bearings in said transmission, a reservoir in said transmission to receive the oil passing through the aforesaid bearings, a transmission gear-wheel extending into said second named reservoir, a reservoir in the flywheel housing of said engine, a conduit leading out of said second named reservoir above the lower peripheral edge of said transmission gear-wheel and communicating with said third named reservoir, a trough on the side wall of the engine fly-wheel housing positioned to receive oil thrown up by the engine fly-wheel, and means for conveying oil from said trough to said first named reservoir.

3. In combination with a power plant of an automobile comprising an engine, a clutch, and a transmission, of an oil reservoir in said engine, means for delivering oil under pressure from said reservoir to bearings in said transmission, a reservoir in said transmission receiving the oil passing through the aforesaid bearings, a transmission gear wheel extending into said second named reservoir, a reservoir in the fly-wheel housing of said engine, a conduit leading out of second named reservoir above the lower peripheral edge of said transmission gear-wheel and communicating with said third named reservoir, a trough on the side wall of the engine fly-wheel housing positioned to receive oil thrown up by the engine fly-wheel, means for conveying oil from said trough to said first named reservoir, and means for conveying oil from said trough to a wearing surface of said clutch.

In testimony whereof I hereunto affix my signature this 25th day of October, 1929.

HAROLD D. CHURCH.